United States Patent
Shang et al.

(10) Patent No.: US 10,229,127 B1
(45) Date of Patent: Mar. 12, 2019

(54) METHOD AND SYSTEM FOR LOCALITY BASED CACHE FLUSHING FOR FILE SYSTEM NAMESPACE IN A DEDUPLICATING STORAGE SYSTEM

(71) Applicant: EMC Corporation, Hopkinton, MA (US)

(72) Inventors: Pengju Shang, Milpitas, CA (US); Pranay Singh, Cupertino, CA (US); George Mathew, Belmont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 147 days.

(21) Appl. No.: 14/575,056

(22) Filed: Dec. 18, 2014

(51) Int. Cl.
*G06F 17/30* (2006.01)
*G06F 12/0831* (2016.01)

(52) U.S. Cl.
CPC .... *G06F 17/30088* (2013.01); *G06F 12/0833* (2013.01); *G06F 17/30156* (2013.01); *G06F 2212/62* (2013.01)

(58) Field of Classification Search
None
See application file for complete search history.

(56) References Cited

U.S. PATENT DOCUMENTS

| | | | | |
|---|---|---|---|---|
| 5,644,701 A * | 7/1997 | Takewaki | ............ | G06F 11/1407 711/144 |
| 6,119,205 A * | 9/2000 | Wicki | ................. | G06F 12/0804 711/122 |
| 6,460,054 B1 * | 10/2002 | Grummon | ........... | G06F 11/1448 |
| 8,954,399 B1 * | 2/2015 | Balakrishnan | .... | G06F 17/30159 707/692 |
| 2005/0044311 A1 * | 2/2005 | Lahiri | ................. | G06F 12/0804 711/113 |
| 2011/0099190 A1 * | 4/2011 | Kreibe | .............. | G06F 17/30722 707/769 |
| 2013/0326150 A1 * | 12/2013 | Phelan | ................ | G06F 12/0895 711/135 |
| 2015/0134616 A1 * | 5/2015 | Zheng | ............... | G06F 17/30575 707/639 |
| 2016/0127307 A1 * | 5/2016 | Jain | ........................ | G06F 3/0619 709/245 |

* cited by examiner

*Primary Examiner* — Reginald G Bragdon
*Assistant Examiner* — James J. Thomas
(74) *Attorney, Agent, or Firm* — Womble Bond Dickinson (US) LLP

(57) ABSTRACT

In one embodiment, a computer-implemented method includes capturing a consistent state of data blocks in a namespace cache of a deduplicating storage system. The data blocks contains data for a file system namespace organized in a hierarchical data structure. Each leaf page of the hierarchical data structure contains one or more data blocks. The method further includes determining, for each data block, whether the data block has been written to base on the captured consistent state. For at least one of the written data blocks in the namespace cache, the method includes searching, in the hierarchical data structure, adjacent data blocks to find in the namespace cache one or more data blocks that have also been written to, and upon finding the one or more adjacent written data blocks, flushing the written data block and the found one or more adjacent written data blocks together into a common storage unit.

20 Claims, 7 Drawing Sheets

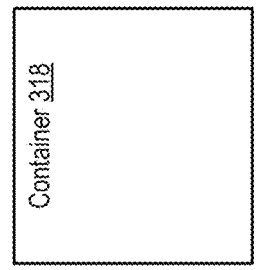
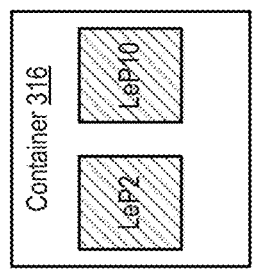
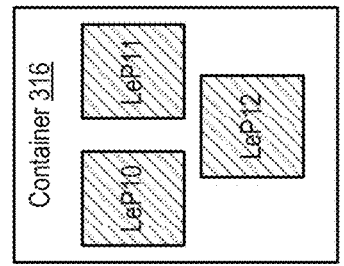
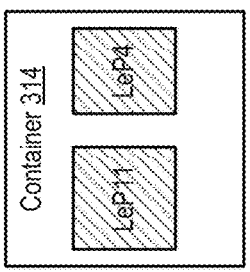
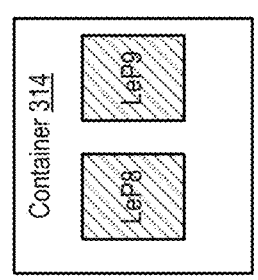
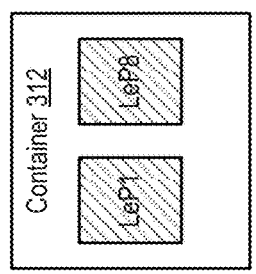
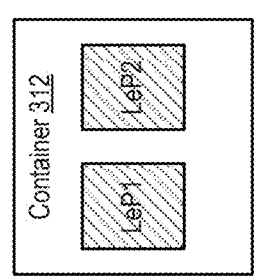
FIG. 5A
FIG. 5B

METHOD AND SYSTEM FOR LOCALITY BASED CACHE FLUSHING FOR FILE SYSTEM NAMESPACE IN A DEDUPLICATING STORAGE SYSTEM

FIELD OF THE INVENTION

Embodiments of the present invention relate generally to storage systems. More particularly, embodiments of the invention relate to locality based cache flushing for file system namespace in a deduplicating storage system.

BACKGROUND

Data storage is a critical component for computing. In a computing device, there is a storage area in the system to store data for access by the operating system and applications. In a distributed environment, additional data storage may be a separate device that the computing device has access to for regular operations. These data storages are generally referred to as storage systems. While earlier storage systems were primarily tape based, disk-based deduplicating storage systems have become dominant as they can deliver an order of magnitude greater data reduction than traditional compression over time.

In a deduplicating storage system, a file system namespace indicates the way files and directories are identified and organized in the storage system. The file system namespace may take any of a variety of different forms. In one embodiment it contains file names, directory names, and the attributes and hierarchy of the files and directories.

When files and directories are added and deleted from the deduplicating storage system, the data blocks containing the file system namespace will be updated. The updated data blocks are written to storage units of the storage system, and the writing is generally based on the frequency and/or order of the update.

BRIEF DESCRIPTION OF THE DRAWINGS

Embodiments of the invention are illustrated by way of example and not limitation in the figures of the accompanying drawings in which like references indicate similar elements.

FIG. 5A illustrates the order of dirty blocks are written to the storage units based on periodically scheduled flushing.

FIG. 5B illustrates the order of dirty blocks are written to the storage units based on locality based flushing according to one embodiment of the invention.

DETAILED DESCRIPTION

Figure 1:
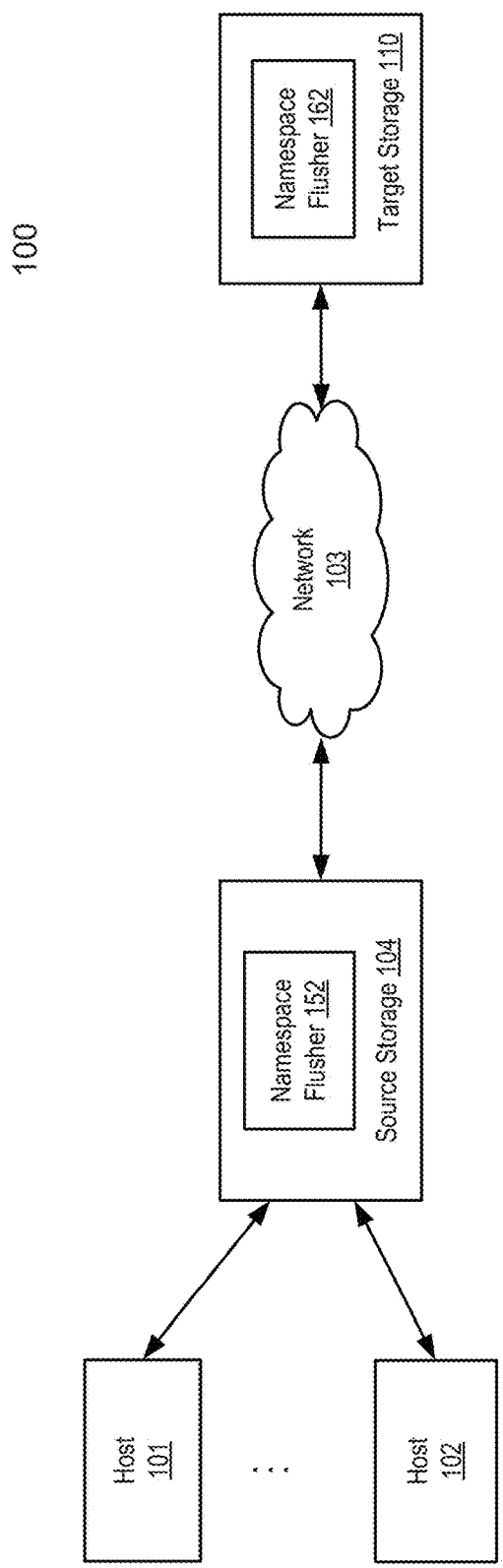
FIG. 1 is a block diagram illustrating a system in which locality based flushing is performed according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

In one embodiment, a computer-implemented method is disclosed. The method includes capturing a consistent state of data blocks in a namespace cache of a deduplicating storage system. The data blocks contain data for a file system namespace organized in a hierarchical data structure containing a layer of root page, a layer of one or more intermediate pages, and a layer of a plurality of leaf pages. Each leaf page contains one or more data blocks and each data block containing a namespace entry corresponding to a file or a directory of a file system of the deduplicating storage system. The method further includes determining, for each data block in the namespace cache, whether the data block has been written to base on the captured consistent state. For at least one of the written data blocks in the namespace cache, the method includes searching, in the hierarchical data structure, adjacent data blocks to find in the namespace cache one or more data blocks that have also been written to, where the adjacent data blocks are associated with a common parent page as the written data block, and upon finding the one or more adjacent written data blocks, flushing the written data block and the found one or more adjacent written data blocks together into a common storage unit.

A deduplicating storage system is disclosed. The deduplicating storage system captures a consistent state of data blocks in a namespace cache of a deduplicating storage system, where the data blocks contain data for a file system namespace organized in a hierarchical data structure containing a layer of root page, a layer of one or more intermediate pages, and a layer of a plurality of leaf pages, and where each leaf page contains one or more data blocks and each data block containing a namespace entry corresponding to a file or a directory of a file system of the deduplicating storage system. The deduplicating storage system determine, for each data block in the namespace cache, whether the data block has been written to base on the captured consistent state. For at least one of the written data blocks in the namespace cache, the deduplicating storage system searches, in the hierarchical data structure, adjacent data blocks to find in the namespace cache one or more data blocks that have also been written to, where the adjacent data blocks are associated with a common parent page as the written data block; and upon finding the one or more adjacent written data blocks, flush the written data block and the found one or more adjacent written data blocks together into a common storage unit.

A non-transitory computer-readable medium is disclosed. The non-transitory computer-readable medium has instruction stored, when executed by a processor, cause the processor to perform operations. The operations include capturing a consistent state of data blocks in a namespace cache of a deduplicating storage system, wherein the data blocks contain data for a file system namespace organized in a hierarchical data structure containing a layer of root page, a layer of one or more intermediate pages, and a layer of a plurality of leaf pages, and wherein each leaf page contains one or more data blocks and each data block containing a namespace entry corresponding to a file or a directory of a file system of the deduplicating storage system. The operations further include determining, for each data block in the namespace cache, whether the data block has been written to base on the captured consistent state. For at least one of the written data blocks in the namespace cache, the operations include searching, in the hierarchical data structure, adjacent data blocks to find in the namespace cache one or more data blocks that have also been written to, where the adjacent data blocks are associated with a common parent page as the written data block, and upon finding the one or more adjacent written data blocks, flushing the written data block and the found one or more adjacent written data blocks together into a common storage unit.

Architecture of a Deduplicating Storage System

FIG. 1 is a block diagram illustrating a system in which locality based flushing is performed according to one embodiment of the invention. Referring to FIG. 1, system 100 includes, but is not limited to, one or more hosts 101-102 communicatively coupled to source storage system 104 and target storage system 110 over network 103. Hosts 101-102 may be any type of hosts such as a server, a personal computer (e.g., desktops, laptops, and tablets), a "thin" client, a personal digital assistant (PDA), a Web enabled system, a gaming device, a media player, or a mobile phone (e.g., Smartphone), etc. Network 103 may be any type of network such as a local area network (LAN), a wide area network (WAN) such as Internet, a corporate intranet, a metropolitan area network (MAN), a storage area network (SAN), a bus, or a combination thereof, wired and/or wireless.

Both source storage system 104 and target storage system 110 may represent any type of server or cluster of servers. For example, source storage system 104 and target storage system 110 may be a storage server used for any of various different purposes, such as to provide multiple users with access to shared data and/or to back up mission critical data. Source storage system 104 and target storage system 110 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Source storage system 104 and target storage system 110 may have a distributed architecture, or all of its components may be integrated into a single unit. Note source storage system 104 and target storage system 110 may have different replication performance characteristics even when they have similar architecture. Source storage system 104 is implemented as part of an archive and/or backup storage system such as a deduplicating storage system available from EMC® Corporation of Hopkinton, Mass. Target storage system 110 may also be implemented as a deduplicated storage system in some embodiments.

Source storages 104 and target storage 110 contain namespace flusher 152 and 162 respectively. Each namespace flusher is configured to perform locality based cache flushing at the respective storage system. The namespace flusher disclosed in embodiments of the invention can be applied to storage systems such as a source storage system, a target storage system, or a backup storage system, where each storage system is physically separated from one another, and each storage system implementing the block managers is a deduplicating storage system.

Figure 2:
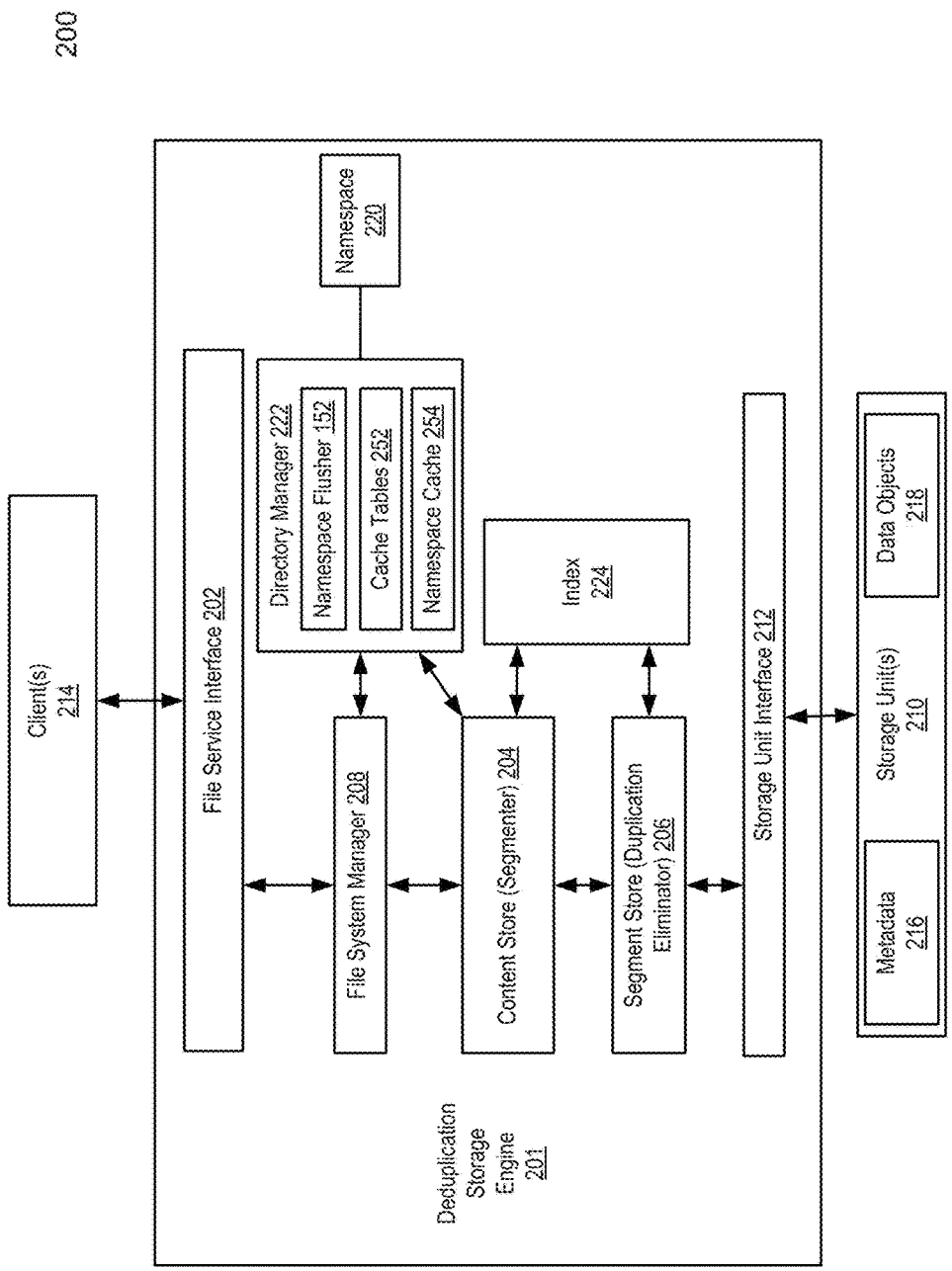
FIG. 2 is a block diagram illustrating a deduplicated source storage system according to one embodiment of the invention.

FIG. 2 is a block diagram illustrating a deduplicating storage system according to one embodiment of the invention. The deduplicating storage system 200 may be a detail implementation of deduplicating source storage system 104 or target storage system 110 illustrated in FIG. 1.

The deduplicating source storage system 200 interfaces one or more clients 214 with one or more storage units 210 storing metadata 216 and data objects 218. Clients 214 may be any kinds of clients, such as, for example, a client application (e.g., from hosts 101/102 of FIG. 1), backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage units (sometimes referred to as storage devices) 210 may be implemented locally (e.g., single node operating environment) or remotely (e.g., multi-node operating environment) via an interconnect, which may be a bus and/or a network (e.g., a storage network). In one embodiment, one of storage units 210 operates as an active storage to receive and store external or fresh user data from a client (e.g., an end-user client or a primary storage system associated with one or more end-user clients), while the another one of storage units 210 operates as a target storage unit to periodically archive data from the active storage unit according to an archiving policy or scheme. Storage units 210 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 210 may also be combinations of such devices. In the case of disk storage media, the storage units 210 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 216, may be stored in at least some of storage units 210, such that files can be accessed independent of another storage unit. Metadata of each storage unit includes enough information to provide access to the files it contains. In one embodiment, metadata may include fingerprints contained within data objects 218, where a data object represents containers, which contains one or more compression regions (CRs) of one or more data chunks, CRs, or data chunks. Each data chunk is a fragment of data block and data chunks are processed and stored in the deduplicated storage system. Fingerprints are mapped to a particular data object via metadata 216, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 216 may include a file name, a storage unit identifier (ID) identifying a storage unit in which the chunks associated with the file name are stored, reconstruction information for the file using the chunks, and any other appropriate metadata information. Metadata 216 may further include a chunk ID, a chunk sketch, a hash of a chunk, an encrypted hash of a chunk, random data, or any other appropriate metadata. In some embodiments, metadata associated with a chunk is used to identify identical and/or similar data segments. The stored metadata enables a faster identification of identical and/or similar data chunks as an ID and/or sketch (e.g., a set of values characterizing the chunk) do not need to be recomputed for the evaluation of a given incoming data segment.

In one embodiment, a chunk ID includes one or more deterministic functions of a data chunk, one or more hash functions of a data chunk, random data, or any other appropriate data chunk ID. In various embodiments, a data chunk sketch includes one or more deterministic functions of a data chunk, one or more hash functions of a data chunk, one or more functions that return the same or similar value for the same or similar data chunks (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a chunk. For example, a sketch may be generated by applying one or more functions (e.g., hash functions) on a chunk and a subset of the results of the functions performed on the chunk (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 201 includes file service interface 202, file system manager 208, content store 204, segment store 206, directory manager 222, namespace 220, index 224, and storage unit interface 212. Deduplication storage engine 201 receives a file or files (or data item(s)) via file service interface 202, which may be part of a file system namespace 220 of a file system associated with the deduplication storage engine 201. The file system namespace 220 is managed by directory manager 222, which contains namespace flusher 152 (or 162 when the deduplicating storage system 200 is target storage 110), cache tables 252, and namespace cache 254, explained in more details herein below. File service interface 202 supports a variety of protocols, including a network file system (NFS), a common Internet file system (CIFS), and a virtual tape library interface (VTL), etc.

The file(s) is/are processed by content store 204 and file system manager 208. Content store 204, also referred to as a segmenter, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based—for example, a hash function is applied to values of data within a sliding window through the data stream or block and when the hash function is equal to a value (or equal to one of several values) then a chunk boundary is identified. In various embodiments, chunk boundaries are identified using content based functions operating on windows within a data stream or block that have a minimum or maximum or other value or any other appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, file system manager 208, also referred to as a file system control module, processes information to indicate the chunk(s) association with a file. In some embodiments, a list of fingerprints is used to indicate chunk(s) associated with a file. File system manager 208 passes chunk association information (e.g., representative data such as a fingerprint) to index 224. Index 224 is used to locate stored chunks in storage units 210 via storage unit interface 212. Segment store 206, also referred to as a duplication eliminator, identifies whether a newly received chunk has already been stored in storage units 210. In the event that a chunk has already been stored in storage unit(s), a reference to the previously stored chunk is stored, for example, in a segment tree associated with the file, instead of storing the newly received chunk. A segment tree of a file may include one or more nodes and each node represents or references one of the deduplicated chunks stored in storage units 210 that make up the file. Chunks are then packed by a container manager (which may be implemented as part of storage unit interface 212) into one or more storage containers stored in storage units 210. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to deduplicated segments). A container may further contain the metadata such as fingerprints, sketches, type of the data chunks, etc. that are associated with the data chunks stored therein.

When a file is to be retrieved, file service interface 202 is configured to communicate with file system manager 208 to identify appropriate chunks stored in storage units 210 via storage unit interface 212. Storage unit interface 212 may be implemented as part of a container manager. File system manager 208 communicates (e.g., via content store 204) with index 224 to locate appropriate chunks stored in storage units via storage unit interface 212. Appropriate chunks are retrieved from the associated containers via the container manager and are used to construct the requested file. The file is provided via file service interface 202 in response to the request. In one embodiment, file system manager 208 utilizes a segment tree (e.g., a segment/segment tree obtained from namespace 220) of content-based identifiers (e.g., fingerprints) to associate a file with data segments/chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 201 may be implemented in software (e.g., executable code executed in a memory by a processor), hardware (e.g., processor(s)), or a combination thereof. For example, deduplication engine 201 may be implemented in a form of executable instructions that can be stored in a non-transitory machine-readable storage medium, where the instructions can be executed in a memory by a processor.

In one embodiment, deduplicating storage system 200 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Periodically Scheduled Flushing of Namespace Cache

In one embodiment, directory manager 222 contains namespace cache 254 to store data blocks of file system namespaces for ease access. Data blocks of file system namespaces in the namespace cache are read and written by clients 214. Writing to the namespace cache may be performed through at least two approaches:

Write-through: Writing is done simultaneously in the namespace cache and the storage units.

Write-back: Writing is initially done only to the namespace cache. The write to the storage units is postponed later in a periodically scheduled flushing.

Embodiments of the invention apply to a deduplicating storage system including an implementation of write-back in namespace cache operations. In the write-back approach, the periodically scheduled flushing writes down the occupied data blocks in namespace cache 254 to storage units 210. Whether a data block is occupied (often referred to as being "dirty") in the cache is indicated by cache tables 252. A deduplicating storage system may contain a plurality of file system namespaces, and each file system namespace may be mapped to a cache table indicating which data blocks in the namespace cache 254 is dirty and the order of the data blocks being written. In an alternative embodiment, the deduplicating storage system contains a single cache table for all the supported file system namespaces, in which case the cache table will indicate the identification of the file system namespace a data block belongs to, the data block being dirty or not, and the order of the data block being written. The order of the data blocks being written in a cache is often indicated linearly from the least recently used (LRU) to the most recently used (MRU). The periodically schedule flushing typically flushes the dirty data blocks from the namespace cache to the storage units according to the LRU-MRU order.

As the writing to the namespace cache 152 by clients 214 typically does not follow a predetermined order, the dirty blocks written to the storage units 210 do not follow a predetermined order. Yet, many applications in a deduplicating storage system can be ran more efficiently when the data blocks of a file system namespace stored in the storage units follow a certain order. For example, system wide garbage collection, file verification, file migration all prefer access to data blocks of a file system namespace according to the logical order of the data blocks of the file system namespace. Thus it is desirable to arrange the write-back of dirty data blocks of a file system namespace to the storage unit according to the logical order of the file system namespace.

Logical Order of File System Namespace Data Blocks

Figures 3A, 3B:
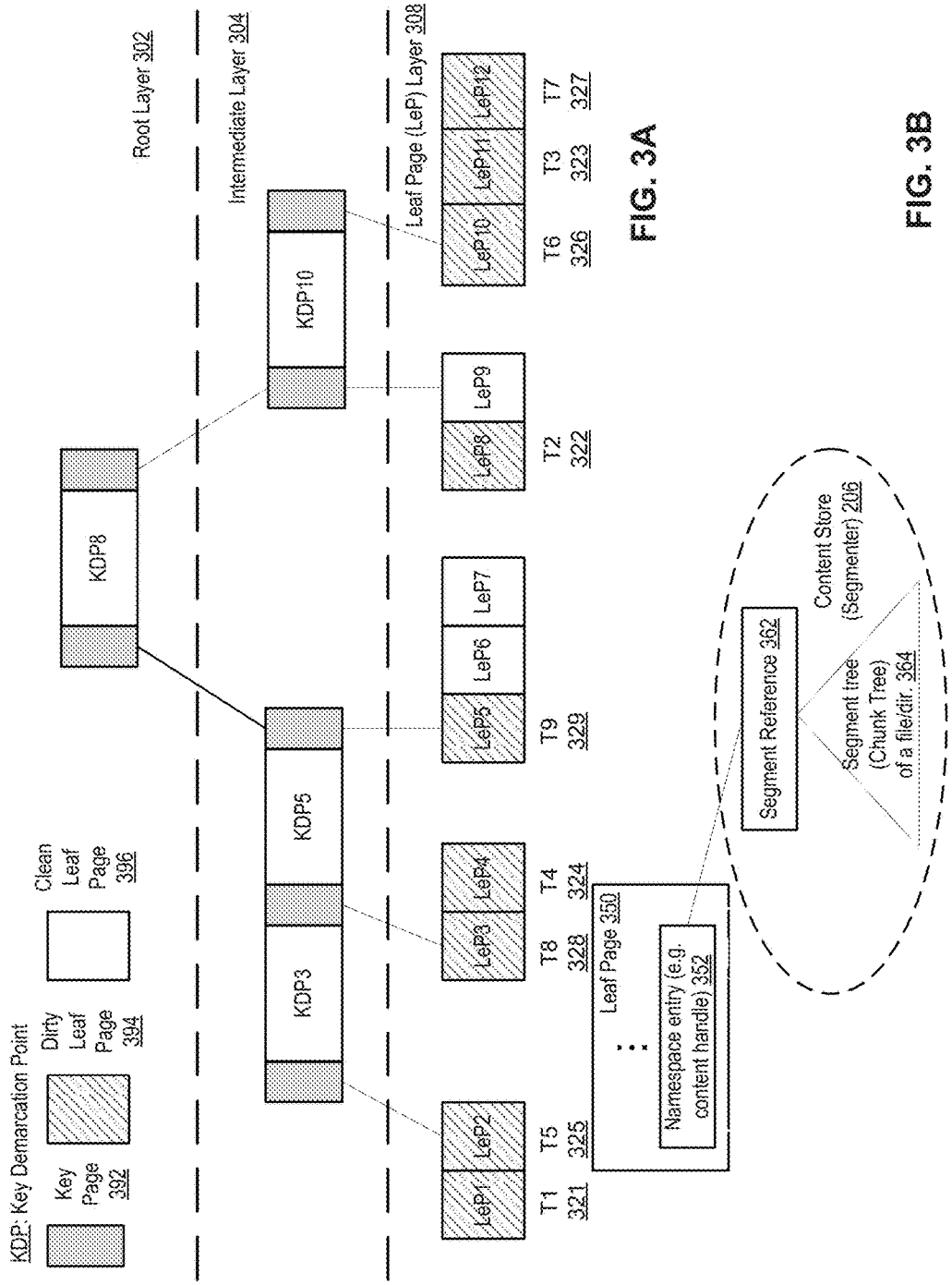
FIG. 3A illustrates a hierarchical data structure of a namespace of a file system according one embodiment of the invention.
FIG. 3B illustrates a namespace corresponding to data segments of a file system of a storage system according one embodiment of the invention.

Namespace 220 corresponds to the file system namespaces of the deduplicating storage system 200. Namespace 220 is managed by directory manager 222, and it is generally organized as a hierarchical data structure. FIG. 3A illustrates a hierarchical data structure of a namespace of a file system according one embodiment of the invention. The hierarchical layer contains a root layer 302, an intermediate layer 304, and a leaf page layer 308. Each layer contains one or more pages (sometimes referred to as "nodes"), referred to as root pages, intermediate pages, and leaf pages respectively. While only one intermediate layer is illustrated in the figure, it is to be understood that the hierarchical data structure may contain multiple intermediate layers. In one embodiment, the hierarchical data structure is a B+ tree ("B" stands for Bayer, which was to honor the inventor Rudolf Bayer), although the principal disclosed in the embodiments of the invention may apply to other hierarchical data structure.

When the hierarchical data structure is a B+ tree, the intermediate pages are referred to as internal pages. The B+ tree stores namespace data at leaf pages. Root pages and intermediate pages contain key pages separated by key demarcation points. Each key page contains key entries represented by <key, data> pairs. The key of a <key, data> pair of the root page and internal page is formed by a computation including a parent inode (index node) and a child inode, and the data of the <key, data> pair of the root page and internal page points to a page of a lower level.

Within each key page, the key entries are sorted in order. The sorting may be performed through hash of the keys (e.g., producing 64 bits look_up keys for each of the <key, data> pairs). Through sorting, the keys with the same parent inode are stored together in a key page. Each key page and leaf page are limited in size, thus key pages are separated by key demarcation points (KDPs), which indicates that all the keys with values less than the KDPs are stored at one side of the KDPs, and all the keys with value larger than the KDPs are stored at the other side of the KDPs. For each root page and internal page, there are n+1 key pages if there are n KDPs. KDPs may represent valid key value themselves.

At each leaf page, the <key, data> pair contains the key points to data, which points to a file or a directory of a file system of the storage system. For each file and directory, there are several keys contained in the B+ tree leaf page. One is inode key (also known as a child key) that has the inode as the data for the key. The inodes represent file system objects, such as files and directories of a file system of the storage system. Another is name key that has the file name as the data. Yet another is name hash key that has the hash value of the name as the data. The <key, data> pairs at the leaf page are generally referred to as the namespace entries.

FIG. 3B illustrates a namespace corresponding to data segments of a file system of a storage system according one embodiment of the invention. Namespace entries of the hierarchical data structure of a namespace correspond to file systems of a storage system. Leaf page 350 is illustrated as an example. Leaf page 350 contains a number of namespace entries such as namespace entry 352, each contains data corresponding to a file or directory of a file system. For example, the data may be a content handle. A content handle can uniquely identify a file or a directory in the file system. Content handle may contain inode, parent inode, namespace identifier, and other information.

The content handle points to a segment reference 362, which corresponds to a segment tree of a file/directory 364. The segment reference 362 and segment tree (also known as chunk tree) 364 are within content store 206, which has been discussed herein above. Segment tree 364 contains chunks mapping to data segments of the file/directory. Thus, the hierarchical data structure of a namespace (stored in namespace 220 and interacting with directory manger 222 of FIG. 2) is different from the segment tree 364 (stored in content store 204 and interacting with file system manager 208 of FIG. 2), even though both are hierarchical data structures.

In a file system of a deduplicated storage system, a file may be represented in a tree having one or more levels of segments in a multi-level hierarchy. In one embodiment, there are seven levels L0 to L6, where L6 is the root level, also referred to as a top parent level representing one or more content handles. More or fewer levels may be applied herein. Each upper level contains one or more references to one or more lower level segments. In one embodiment, an upper level segment contains a fingerprint (e.g., metadata) of fingerprints of its child level segments. Only the lowest level segments are the actual data segments containing the actual deduplicated segments. Thus, L1 to L6 are segments only contain metadata of their respective child segments(s), referred to herein as LP segments.

In one embodiment, when accessing a file, a directory manager traverses the namespace represented by the hierarchical data structure described above until it reaches the leaf pages of the hierarchical data structure to obtain a content handle of the file. A container manager or content store manager (not shown) traverses the segment tree associated with the content handle identified by the directory manager, starting from the root level to leaf nodes. For example, the container manager obtains the fingerprints of the root level segments, in this example, L6 segments, as part of content handles. Based on the fingerprints of the current level segments, the container manager, which may be part of a content store manager, can identify which of the containers in which the segments are stored based on indexing information from the index (not shown). The index may be maintained in the system memory (e.g., volatile memory) and/or in a storage device (e.g., non-volatile memory). The index includes information mapping a fingerprint to a storage location that stores a segment represented by the fingerprint. In one embodiment, the index may be a fingerprint-to-container identifier (FP/CID) index that maps a particular fingerprint to a container that contains the corresponding segment or a compression region (CR) having the segment stored therein.

The metadata (e.g., fingerprints) and the data section of the current level segments can be obtained from the identified container. A container may contain metadata or fingerprints of all segments stored therein, where segments are compressed into a compression region. A segment can be obtained by retrieving the entire container or the corresponding compression region from the storage device or disk. Based on the metadata or the data section of a current level segment, its child segment or segments can be identified, and so on, until it reaches the leaf nodes representing the actual deduplicated segments. Throughout this application, for the purpose of illustration, a container contains one or more compression regions and each compression region contains one or more segments therein. However, the techniques may also be applied to other storage layouts.

Referring back to FIG. 3A, each leaf page contains namespace entries. Each leaf page is limited in size. In one embodiment, each leaf page is 64 kilo bytes (KB). Similar to key pages, the leaf pages are also sorted in order and the namespace entries within a leaf page are also sorted in order. The sorting may be performed through hash of the keys (e.g., producing 64 bits look_up keys for each of the <key, data> pairs). Through sorting, the namespace entries with the same parent inode are stored together. Thus, the leaf pages 1 and 2 (denoted as LeP1 and LeP2 respectively) contain namespace entries pointed to from the same key page (the key page at the left of KDP3), and the namespace entries within LeP1 are all in orders higher than the namespace entries within LeP2. Similarly, the leaf pages 3 and 4 (denoted as LeP3 and LeP4 respectively) contain namespace entries pointed to from the same key page (the key page at the right of KDP3 and the left of KDP5), and the namespace entries within LeP3 are all in orders higher than the namespace entries within LeP4. However, the namespace entries within LeP3 are all in orders lower than the namespace entries within LeP1 and LeP2. In other words, all the namespace entries of the leaf pages of the leaf page layer 308 are ordered from the highest to the lowest according to their keys. The numbering of LeP and KDP in FIG. 3A with numerical orders indicates the orders of the leaf pages and key pages.

A benefit of B+ tree to store the namespaces of file systems of a storage system is efficient search time. For example, to search a data in one million <key, data> pairs, a balanced binary tree requires about 20 block reads, while a B+ tree requires only about 4 block reads.

Namespace entries and key page entries associated with file systems are updated during operations of the storage system. The updates are not in a predetermined order and depend on the nature of operations. For example, when a directory grows to contain a large number of files and then subsequently removes a substantial portion of the files, the operations generate leaf pages that are substantially full initially and then become empty when the files are removed. When a leaf page becomes empty, it will be collected and reused.

FIG. 3A illustrates occupied (referred to as "dirty") leaf pages containing data with shadowed boxes while the empty (referred to as "clean") leaf page not containing data with clean boxes. As illustrated, leaf pages 1-5, 8, and 10-12 are dirty while leaf pages 6-7 and 9 are clean. In this example, these dirty pages are stored in the namespace cache as dirty data blocks. The latest access time for each dirty data block is listed, and they are T1-T9 at references 321-329 respectively. Based on the latest access time of the dirty data blocks, the periodically schedule flushing may flush these dirty data blocks based on the latest access time.

FIG. 5A illustrates the order of dirty blocks are written to the storage units based on periodically scheduled flushing. The dirty blocks are written to containers of the deduplicating storage system. As dirty pages 1 and 8 are last accessed close in time, they are stored together in a common container 312. Similarly, dirty pages 11 and 4, 2 and 10 are last accessed close in time, they are stored in common containers 314 and 314 respectively. With the periodically scheduled flushing, the pages of a file system namespace are not stored in their logical order as illustrated in FIG. 3A, and the ordering based on access may result in repeated container access when a single contain access would suffice if the pages are stored in alignment with the logical order of the hierarchical data structure of the file system namespace.

Locality Based Flushing of Namespace Cache

As periodically scheduled flushing is not efficient for file system namespace data blocks, embodiments of the invention utilize locality based flushing. The locality based flushing looks for the logical order of dirty data blocks within a namespace cache and attempt to flush logically adjacent dirty data blocks in a common storage unit (e.g., a common container).

Figure 4A:
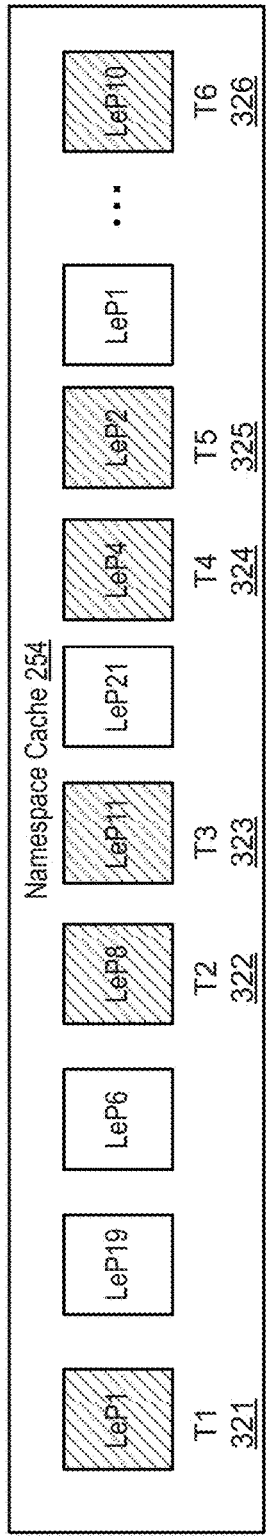
FIG. 4A illustrates a namespace cache according to one embodiment of the invention.

FIG. 4A illustrates a namespace cache according to one embodiment of the invention. Namespace cache 254 contains pages of a file system namespace such as the one organized as a hierarchical tree structure as illustrated in FIG. 3A. Namespace cache 254 may contain data blocks of other file system namespaces in one embodiment. In an alternative embodiment, a number of namespace caches are implemented, and each contains data blocks of one file system namespace. Data blocks in namespace cache 254 are written to and read from by clients. As data blocks are written to the namespace cache, an empty data block becomes occupied thus dirty. As dirty data blocks are flushed to the storage units, they become empty thus clean and available for the clients to write to. In this example, leaf pages 1, 8, 11, 4, 2, and 10 are dirty while the rest of leaf pages are clean. Note in this example, each leaf page occupies a data block of the namespace cache. However, a leaf page may occupy more than a data block, and a data block may also accommodate multiple leaf pages.

Figure 4B:
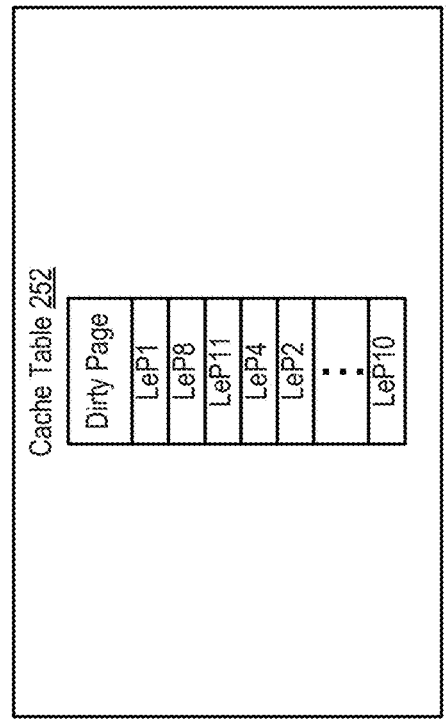
FIG. 4B illustrate a cache table according to one embodiment of the invention.

FIG. 4B illustrate a cache table according to one embodiment of the invention. Cache table 252 keeps track of dirty pages within namespace cache 254. Thus, leaf page 1, 8, 11, 4, 2, and 10 are listed as dirty pages. Each cache table is for one file system namespace, and it is updated as pages become dirty and clean when access of the pages occurs within the deduplicating storage system. In one embodiment, the cache table keeps the order of the dirty pages (or data blocks) are accessed.

Instead of periodically schedule flushing, embodiments of the invention select a dirty page, and obtain its internal page, which is the parent page of the dirty page. From the parent page, the adjacent pages of the dirty page can be identified. For example, for the dirty leaf page 1 (LeP1), its adjacent page is leaf page 2 (LeP2) as illustrated in FIG. 3A. Then it is determined if any of the adjacent pages is in the namespace cache and also dirty. If one or more are, the adjacent dirty pages should be flushed with the dirty page, so they can be stored in the common storage unit.

FIG. 5B illustrates the order of dirty blocks are written to the storage units based on locality based flushing according to one embodiment of the invention. As illustrated, dirty leaf page 1 is now stored together with dirty leaf page 2 in the common container, container 312. Similarly, dirty leaf page 8 is now stored together with dirty leaf page 9 in the common container 314; and dirty leaf pages 10-12 are stored together in container 316.

Following the locality based flushing, the corresponding cache table may update the status of the flushed pages to be clean. With that, the periodically scheduled flushing now flush less pages as the pages flushed by the locality based flushing do not need to be flushed again. Since flushing dirty pages require the namespace cache to be locked, reducing the load of the periodically scheduled flushing means the namespace cache locking time is distributed.

With the locality based flushing, the locality of the dirty pages are maintained in the storage units. Then the read of the dirty pages will be more efficient. The system wide applications such as garbage collection, file verification, and file migration can be performed more efficiently.

A Flow Diagram

Figure 6:
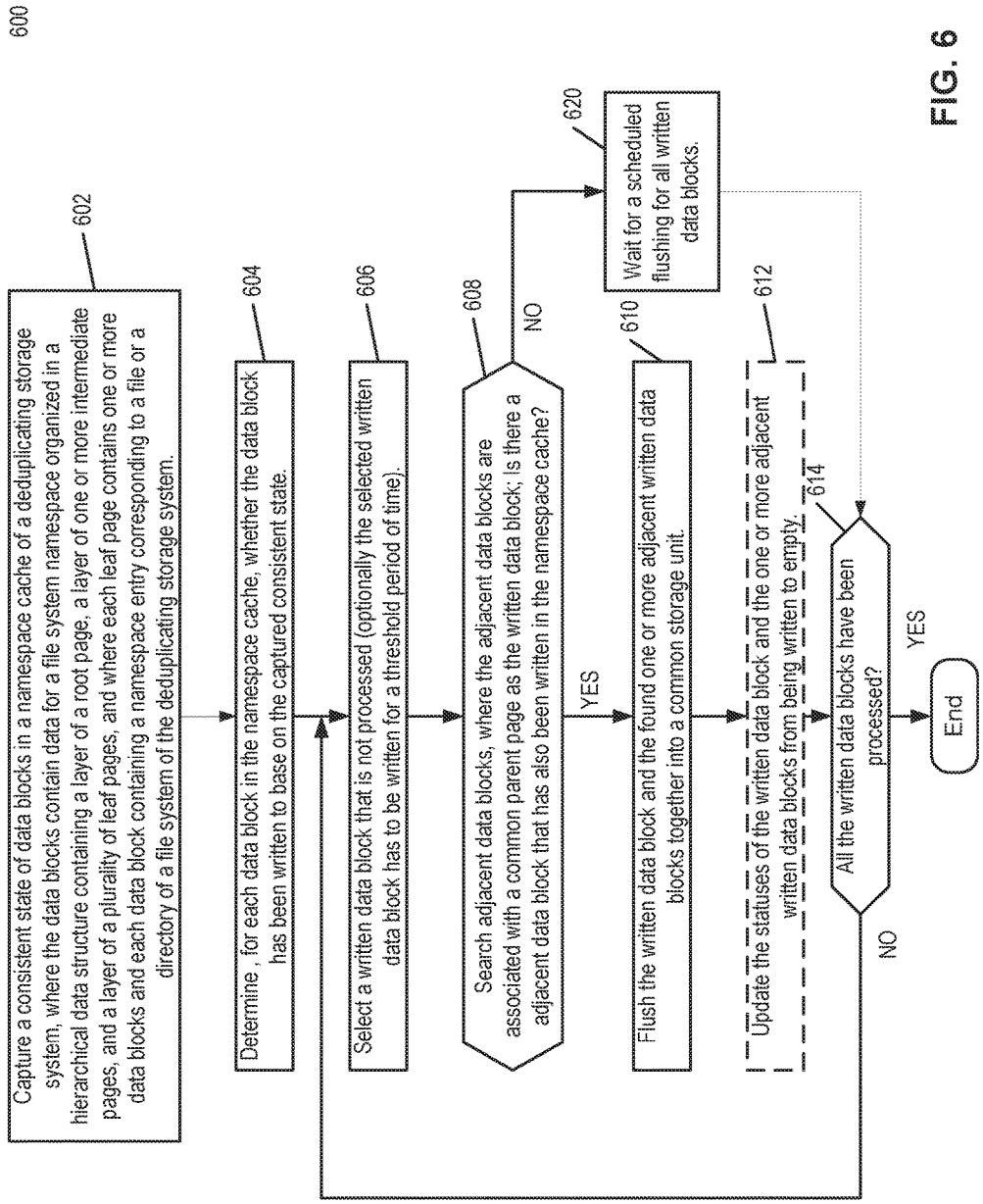
FIG. 6 is a flow diagram illustrating a method of locality based flushing according to one embodiment of the invention.

FIG. 6 is a flow diagram illustrating a method of locality based flushing according to one embodiment of the invention. Method 600 may be performed in a deduplicating storage system, particularly by namespace flusher 152 as illustrated in FIG. 2 in one embodiment.

At reference 602, a consistent state of data blocks in a namespace cache of a deduplicating storage system is captured. The data blocks contains data for a file system namespace organized in a hierarchical data structure containing a layer of root page, a layer of one or more intermediate pages, and a layer of a plurality of leaf pages, and wherein each leaf page contains one or more data blocks and each data block containing a namespace entry corresponding to a file or a directory of a file system of the deduplicating storage system.

One way to capture the consistent state of data blocks in the namespace cache is to take a snapshot of the namespace cache. The snapshot is a point-in-time copy of the namespace cache, and it records the state of the namespace cache at the given moment and preserves that snapshot as a guide for restoring the namespace cache in the event that it fails.

In one embodiment, the hierarchical data structure a B+ tree data structure, and each intermediate page is an internal page of the B+ tree, and each internal page is a parent page of one or more leaf pages.

At reference 604, it is determined, for each data block in the namespace cache, whether the data block has been written based on the captured consistent state. The status of data blocks being written or not is indicated in the captured consistent state. In one embodiment, the status being dirty indicates the data block has been written since an immediately previous captured consistent state (e.g., the last snapshot prior to the current snapshot). A flag may be set to for the data block, indicating the data block being dirty at the present consistent state. In one embodiment, the status of the data block is tracked by a cache table, indicating which data block has been written since the previous captured consistent state thus dirty, and it may also indicate the sequence of the data blocks being written, for example, listing the data blocks from the least to the most recent written.

At reference 606, a written data block that has not been processed by the method is selected. In one embodiment, only the data blocks that has been written for a threshold period of time is eligible for selection for further process in method 600. The rationale is that when the data block is freshly written, it may be written again soon, thus it should not be flushed to the storage unit. The threshold period of time may be adjustable or fixed, depending on the implementation. For example, the threshold period of time may be set to be a value between one and five seconds.

At reference 608, the adjacent data blocks of the written data block in the hierarchical data structure is searched. The search includes finding the parent page of the written data block, and the other data blocks referred to by the parent page are the adjacent data blocks. The parent page may be referred to as the common parent page of the written data block and the adjacent data blocks. The search is to find the adjacent data blocks that have also been written since the immediately previous captured consistent state. If one or more adjacent written data blocks are found, the selected written data block and the found one or more adjacent written data blocks are flushed together in a common storage unit (e.g., a container) at reference 610. Otherwise, the selected data block is considered processed, and it waits for a scheduled flushing for all written data blocks at reference 620. The flow then goes to reference 614, which determines if all the eligible written data blocks have been processed, and the process end if they have. Otherwise the flow goes back to reference 606.

After the written data block and the one or more adjacent written data blocks are flushed to the common container, optionally the statuses of the written data blocks are updated from being written to empty so that these data blocks may be written again. The process then goes to reference 614, whose operations have been described herein above.

Note the locality based flushing may work along with the periodically scheduled flushing, and the written data blocks that are not flushed by the locality based flushing may be flushed by the periodically scheduled flushing (e.g., after reference 620), where locality of the written data blocks are not considered. Note a single namespace flusher, such as namespace flusher 152 may perform both the locality based flushing and the periodically schedule flushing in one embodiment. In an alternative embodiment, the locality based flushing and the periodically schedule flushing are performed by different flushers.

Exemplary Storage System

Figure 7:
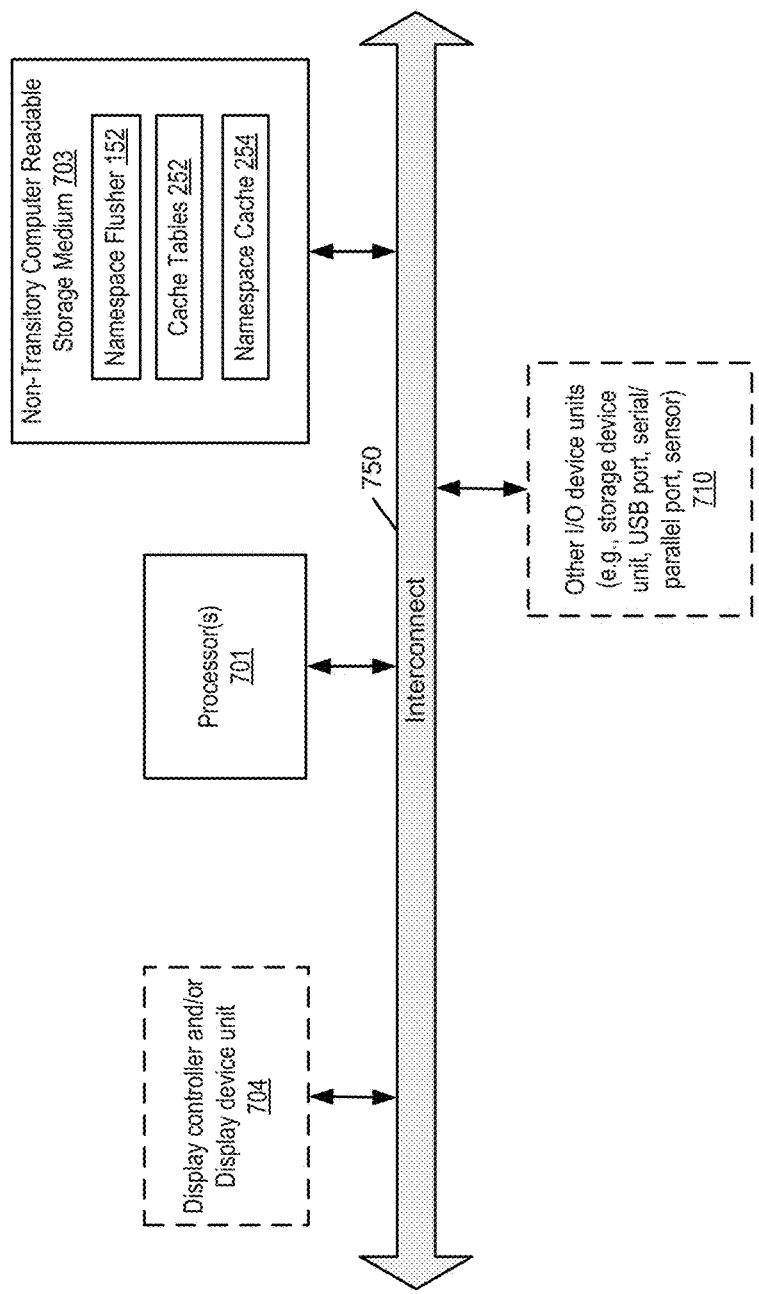
FIG. 7 is a block diagram illustrating a storage system that may be used with one embodiment of the invention.

FIG. 7 is a block diagram illustrating a storage system that may be used with one embodiment of the invention. For example, system 700 may represent any of the storage system described above performing any of the processes or methods described above. System 700 can include many different components, where optional components are illustrated with dotted boxes. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that system 700 is intended to show a high level view of many components of the computing system. However, it is to be understood that additional components may be present in certain implementations and furthermore, different arrangement of the components shown may occur in other implementations.

In one embodiment, system 700 includes processor 701, memory 703, and device units 704-710 that are interconnected via a bus or an interconnect 750. Processor 701 may represent a single processor or multiple processors with a single processor core or multiple processor cores included therein. Processor 701 may represent one or more general-purpose processors such as a microprocessor, a central processing unit (CPU), or processing device. More particularly, processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 701 may communicate with memory 703, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 that will offer extensions to LPDDR2 to increase bandwidth. As examples, 2/4/8 gigabytes (GB) of system memory may be present and can be coupled to processor 701 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

Memory 703 may include one or more volatile storage (or memory) devices such as random access memory (RAM), dynamic RAM (DRAM), synchronous DRAM (SDRAM), static RAM (SRAM), or other types of storage devices.

Memory 703 may store information including sequences of instructions that are executed by processor 701, or any other device units. For example, executable code and/or data of a variety of operating systems, device drivers, firmware (e.g., input output basic system or BIOS), and/or applications can be loaded in memory 703 and executed by processor 701. An operating system can be any kind of operating systems, such as, for example, Windows® operating system from Microsoft®, Mac OS®/iOS® from Apple®, Android® from Google®, Linux®, Unix®, or other real-time or embedded operating systems such as VxWorks®.

To provide for persistent storage of information such as data, applications, one or more operating systems and so forth, a mass storage (not shown) may also couple to processor 701. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 701, e.g., via a serial peripheral interface (SPI). This flash device may provide for non-volatile storage of system software, including a basic input/output software (BIOS) as well as other firmware of the system.

In one embodiment, processor 701 of system 700 is configured to execute data and instructions stored in memory 703. The data and instructions include namespace flusher 152, cache tables 252, and namespace cache 254.

In one embodiment, namespace flusher 152 performs locality based flushing as discussed herein above along with cache tables 252 and namespace cache 254.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
capturing a consistent state of data blocks in a namespace cache of a deduplicating storage system, wherein the data blocks contain data for a file system namespace organized in a hierarchical data structure containing a layer of root page, a layer of one or more intermediate pages, and a layer of a plurality of leaf pages, and wherein each leaf page contains one or more data blocks and each data block containing a namespace entry corresponding to a file or a directory of a file system of the deduplicating storage system;
determining, for each data block in the namespace cache, whether the data block has been written to based on the captured consistent state of the data blocks in the namespace cache, the captured consistent state of the data blocks in the namespace cache having a status of the data block indicative whether the data block has been written to since an immediately previous captured consistent state;
tracking an order of the data blocks being written in the namespace cache with a cache table, wherein statuses of the data blocks are updated in the cache table as the data blocks are written to and flushed when access of the data blocks occurs within the deduplicating storage system;
according to the order of the data blocks being written, for at least one of the written data blocks in the namespace cache,
searching, in the hierarchical data structure, logically adjacent data blocks to find in the namespace cache one or more data blocks that have also been written to since the immediately previous captured consistent state including finding a parent page of the written data block and further data blocks referred to by a parent page of the logically adjacent data blocks, wherein the parent page of the written data block and the parent page of the logically adjacent data blocks is a common parent page; and
upon finding the one or more logically adjacent written data blocks, flushing the written data block and the found one or more logically adjacent written data blocks together into a common storage unit, wherein the written data block and the found one or more logically adjacent written data blocks are stored in the common storage unit.

2. The method of claim 1, wherein the capturing the consistent state of the data blocks is through a snapshot of the namespace cache.

3. The method of claim 1, wherein the hierarchical data structure is a B+ tree data structure, and each intermediate page is an internal page of the B+ tree, and each internal page is a parent page of one or more leaf pages.

4. The method of claim 1, wherein the at least one of the written data blocks are selected additionally based on the data blocks having been written for a threshold period of time.

5. The method of claim 1, wherein the at least one of the written data blocks includes all the written data blocks.

6. The method of claim 1, further comprising:
for the at least one of the written data blocks in the namespace cache, upon finding no adjacent written data blocks in the namespace cache, keeping the written data blocks to wait for a scheduled flushing for all written data blocks.

7. The method of claim 1, further comprising:
updating statuses of the written data block and the one or more adjacent written data blocks from being written to empty upon flushing them into the common storage unit.

8. The method of claim 7, further comprising:
flushing all the written data blocks of the namespace cache into one or more storage units, wherein the flushing is performed according to the order of the data blocks being written.

9. A deduplicating storage system, comprising:
a processor and a non-transitory computer readable storage medium coupled to the processor, the non-transitory machine-readable storage medium containing instructions executable by the processor, wherein the deduplicating storage system is operative to:
capture a consistent state of data blocks in a namespace cache of a deduplicating storage system, wherein the data blocks contain data for a file system namespace organized in a hierarchical data structure containing a layer of root page, a layer of one or more intermediate pages, and a layer of a plurality of leaf pages, and wherein each leaf page contains one or more data blocks and each data block containing a namespace entry corresponding to a file or a directory of a file system of the deduplicating storage system,
determine, for each data block in the namespace cache, whether the data block has been written to based on the captured consistent state of the data blocks in the namespace cache, the captured consistent state of the data blocks in the namespace cache having a status of the data block indicative whether the data block has been written to since an immediately previous captured consistent state,
track an order of the data blocks being written in the namespace cache with a cache table, wherein statuses of the data blocks are updated in the cache table as the data blocks are written to and flushed when access of the data blocks occurs within the deduplicating storage system,
according to the order of the data blocks being written, for at least one of the written data blocks in the namespace cache,
search, in the hierarchical data structure, logically adjacent data blocks to find in the namespace cache one or more data blocks that have also been written to since the immediately previous captured consistent state, wherein the search of the logically adjacent data blocks includes finding a parent page of the written data block and further data blocks referred to by a parent page of the adjacent data blocks, wherein the parent page of the written data block and the parent page of the logically adjacent data blocks is a common parent page, and
upon finding the one or more logically adjacent written data blocks, flush the written data block and the found one or more logically adjacent written data blocks together into a common storage unit, wherein the written data block and the found one or more logically adjacent written data blocks are stored in the common storage unit.

10. The deduplicating storage system of claim 9, wherein the capture of the consistent state of the data blocks is through a snapshot of the namespace cache.

11. The deduplicating storage system of claim 9, wherein the hierarchical data structure is a B+ tree data structure, and each intermediate page is an internal page of the B+ tree, and each internal page is a parent page of one or more leaf pages.

12. The deduplicating storage system of claim 9, wherein the at least one of the written data blocks are to be selected additionally based on the data blocks having been written for a threshold period of time.

13. The deduplicating storage system of claim 9, wherein the at least one of the written data blocks includes all the written data blocks.

14. The deduplicating storage system of claim 9, wherein the deduplicating storage system is further operative to:
for the at least one of the written data blocks in the namespace cache, upon finding no adjacent written data blocks in the namespace cache, keep the written data blocks to wait for a scheduled flushing for all written data blocks.

15. The deduplicating storage system of claim 9, wherein the deduplicating storage system is further operative to:
update statuses of the written data block and the one or more adjacent written data blocks from being written to empty upon flushing them into the common storage unit.

16. The deduplicating storage system of claim 9, wherein the deduplicating storage system is further operative to:
flush all the written data blocks of the namespace cache into one or more storage units, wherein the flushing is performed according to the order of the data blocks being written.

17. A non-transitory computer-readable medium having instructions stored therein, which when executed by a processor, cause the processor to perform operations, the operations comprising:
capturing a consistent state of data blocks in a namespace cache of a deduplicating storage system, wherein the data blocks contain data for a file system namespace organized in a hierarchical data structure containing a layer of root page, a layer of one or more intermediate pages, and a layer of a plurality of leaf pages, and wherein each leaf page contains one or more data blocks and each data block containing a namespace entry corresponding to a file or a directory of a file system of the deduplicating storage system;

determining, for each data block in the namespace cache, whether the data block has been written to based on the captured consistent state of the data blocks in the namespace cache, the captured consistent state of the data blocks in the namespace cache having a status of the data block indicative whether the data block has been written to since an immediately previous captured consistent state;

tracking an order of the data blocks being written in the namespace cache with a cache table, wherein statuses of the data blocks are updated in the cache table as the data blocks are written to and flushed when access of the data blocks occurs within the deduplicating storage system;

according to the order of the data blocks being written, for at least one of the written data blocks in the namespace cache, searching, in the hierarchical data structure, logically adjacent data blocks to find in the namespace cache one or more data blocks that have also been written to since the immediately previous captured consistent state including finding a parent page of the written data block and further data blocks referred to by a parent page of the logically adjacent data blocks, wherein the parent page of the written data block and the parent page of the logically adjacent data blocks is a common parent page; and upon finding the one or more logically adjacent written data blocks, flushing the written data block and the found one or more logically adjacent written data blocks together into a common storage unit, wherein the written data block and the found one or more logically adjacent written data blocks are stored in the common storage unit.

18. The non-transitory computer-readable medium of claim 17, wherein the capturing the consistent state of the data blocks is through a snapshot of the namespace cache.

19. The non-transitory computer-readable medium of claim 17, wherein the hierarchical data structure is a B+ tree data structure, and each intermediate page is an internal page of the B+ tree, and each internal page is a parent page of one or more leaf pages.

20. The non-transitory computer-readable medium of claim 17, the operations further comprising:

updating statuses of the written data block and the one or more adjacent written data blocks from being written to empty upon flushing them into the common storage unit.

* * * * *